Figure 1:
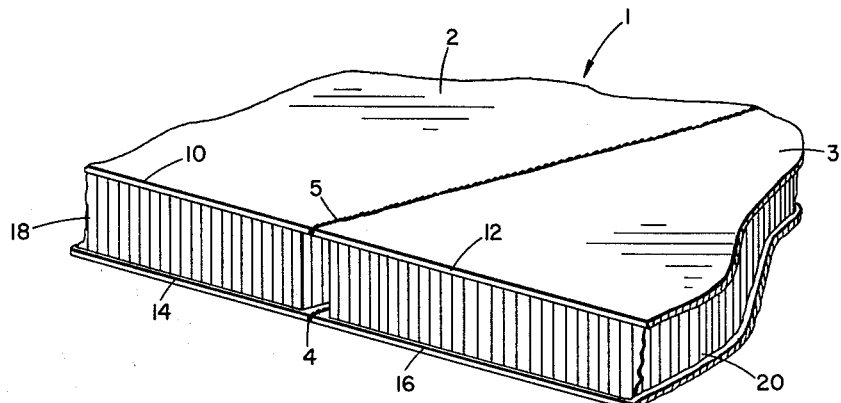

July 30, 1963     R. G. ROHRBERG     3,099,740

WELDED JOINT AND METHOD FOR MAKING SAME

Filed Nov. 3, 1961     2 Sheets-Sheet 1

INVENTOR.
RODERICK G. ROHRBERG

BY

ATTORNEY

United States Patent Office 3,099,740
Patented July 30, 1963

3,099,740
WELDED JOINT AND METHOD FOR MAKING SAME
Roderick G. Rohrberg, Inglewood, Calif., assignor to North American Aviation, Inc.
Filed Nov. 3, 1961, Ser. No. 150,009
14 Claims. (Cl. 219—125)

The invention concerns an improved type of welded joint as well as a method for forming such joint. More particularly, this invention concerns welding to join workpieces of lightweight sheet or panel form, or between members having relatively thin portions such as sheet metal flanges or the like which are welded to similar workpiece portions.

The invention disclosed herein is applicable to the fabrication of any structure which requires joinder of flange-like portions of the type stated above. However, a particular need for this invention exists in connection with fabrication of precipitation hardenable stainless steel sandwich type panels having a lightweight cellular core affixed between two face sheets.

Welding of extremely thin gauge sheet metal such as mentioned above presents formidable problems not heretofore encountered in the welding art. As in welding generally, the puddle temperature is normally raised much higher than the melting point of the base metal, and some welding heat permeates the base metal surrounding the weld area. Changes such as expansion and shrinkage of the heat-affected area normally result from the welding operation, as well as changes in physical properties such as strength and ductility. Moreover, metallurgical effects such as recrystallization and heat treatment occur due to the application of welding heat.

These several effects are particularly emphasized in the case of joining light or thin-walled members to each other, due primarily to the high rate of thermal conductivity of thin metallic sections, causing welding heat to be generally spread over a wide area which produces greater and more uneven expansion during heating and commensurately irregular shrinkage after welding. Also, such members undergo wider variations in unit stress than do larger, heavier members during heating and therefore require external support to prevent buckling. Such support is normally unnecessary in welding relatively larger workpieces wherein the mass of the workpiece is sufficient to safely dissipate the welding heat within the time required to effect fusion of the material.

Inability of the mass to dissipate heat in the joinder of thin or light workpieces results in acute residual stress in such workpieces. Residual stress is caused by shrinkage during cooling of molten metal in the area of the weld, and by phase transformation of the granular structure in the base metal beyond the area of the weld.

The problem of maintaining dimensional accuracy in workpieces of the type described above is considerably aggravated when welding along two or more joints is required in such workpieces. Thus, the residual stress resulting from each individual weld seam results in the application of forces in many different amounts and in non-uniform directions whereby some of the stress resulting from each weld may be cancelled or counterbalanced by stresses resulting from other welds or may combine therewith to produce cumulative stresses depending upon the direction involved in each case. The amount and direction of residual stresses resulting from each weld seam depend partly upon the amount of welding heat applied to the workpiece material, the rate of cooling in such material after welding, the distribution of workpiece mass, and the properties of the workpiece material. Residual stresses usually have an extremely deleterious effect upon the strength of the welded article as well as the final dimensions thereof, since loads externally applied to the workpiece must be limited so that the combined stresses of both external and residual type will not exceed the yield or rupture limit of the workpiece material.

Moreover, the welding problem described above is additionally complicated by the fact that new material and alloys only recently discovered in the metallurgical field are employed in the fabrication of panels such as described above for use in outer skin surfaces of high speed aerial and space vehicles. Illustrative of these materials is the alloy commonly designated PH15-7Mo, comprised of the following components:

| | |
|---|---|
| Carbon | .09 percent maximum. |
| Manganese | 1.00 percent maximum. |
| Phosphorous | .04 percent maximum. |
| Sulphur | .03 percent maximum. |
| Silicon | 1.00 percent maximum. |
| Chromium | 14.00 to 16.00 percent. |
| Nickel | 6.5 to 7.5 percent. |
| Molybdenum | 2.00 to 3.00 percent. |
| Aluminum | .75 to 1.5 percent. |
| Iron | Balance. |

While the stated precipitation hardenable alloys including PH15-7Mo provide great strength at elevated temperatures, such materials are characterized by relatively severe shrinkage during the cooling period following welding of the workpiece material. Thus, in the joinder of sandwich type panels such as described above, elongated ruptures and material failures in the welded area are frequently encountered after welding, principally due to the fact that shrinkage in the zone of fusion and the area adjacent thereto causes high residual stress in consequence of the restraining force exerted by the base metal surrounding the weld area. The weakening and distorting effects of such shrinkage in thin sections of materials such as designated above are both unavoidable and acute.

In the joinder of sandwich type panels such as discussed above, the size and arrangement of welds formed between confronting edges of individual panel components has a significant effect on the results of shrinkage at the location of each weld. Attachment of two panels of the stated type such as required to form a continuous generally planar workpiece involves welding the upper and lower face sheets of one panel to the upper and lower face sheets of the other panel, respectively. When access to both sides of the panel is not possible, joinder of such panels by high strength accurate welded joints in which the residual stress and shrinkage effects discussed above are reduced or avoided cannot be achieved by any conventional welding method known heretofore.

Accordingly, it is a general object of this invention to provide an improved weld joint between relatively thin members.

It is also an object in this case to provide an improved high strength welded connection between adjacent sections of metallic lightweight sandwich type panels.

It is also an object of this invention to provide an improved welded connection in a workpiece involving a plurality of weld seams wherein the workpiece material has a particular propensity to expand and to shrink upon the application of heat or upon cooling the same, respectively.

It is a further object in this case to provide an improved method for forming welded connections as described in the above objects.

Other objects and advantages will become apparent upon a close reading of the following detailed description of the inventive concept, reference being had to the accompanying drawing wherein:

FIGURE 1 shows a general perspective view of a joint formed between two individual panel sections according to the inventive teachings disclosed herein.

Figure 2:
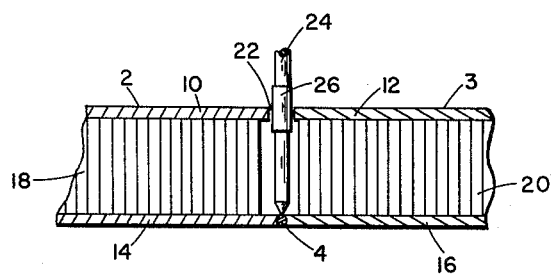
Figure 3:
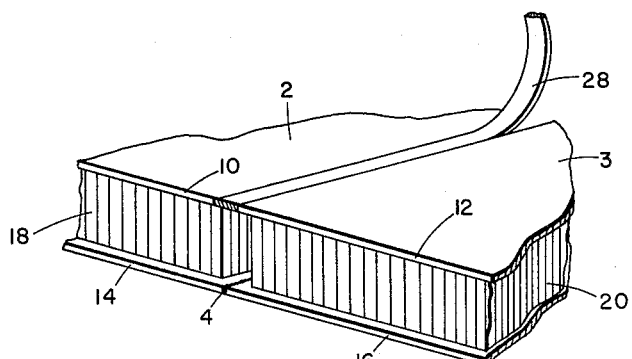
Figure 4:
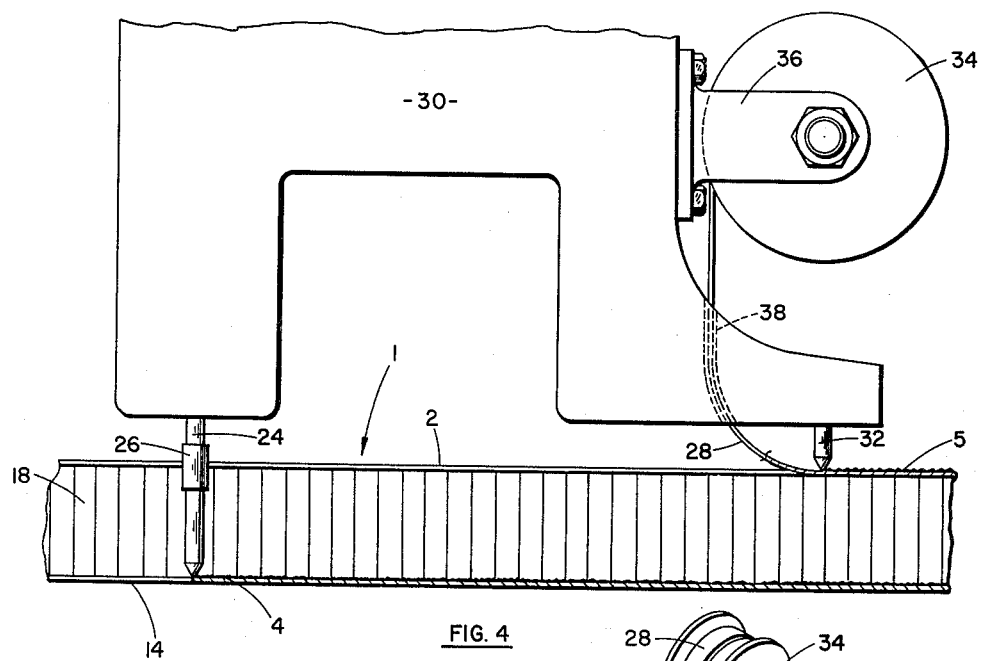

FIGURE 2 shows an end view in partial cross-section of a joint similar to the one shown in FIGURE 1 during an intermediate stage in its fabrication, FIGURE 3 shows a general perspective view of the joint shown by FIGURE 2 at a slightly later intermediate stage during its fabrication, FIGURE 4 shows a vertical elevation, partly broken away, of an illustrative embodiment of apparatus for forming a welded joint such as shown by FIGURES 1–3, and FIGURE 5 shows a general perspective view, partly broken away, of the apparatus shown by FIGURE 4.

Referring to FIGURE 1, an illustrative embodiment of the principles disclosed herein as applied to joinder of two lightweight sandwich type panels may be seen. The panel connection illustrated represents a new approach to the problem of securing such panels to each other or to other structure having flange or sheet-like portions to which both face sheets of the panel must be joined by strong and secure weldments. Thus, a single unitary panel or workpiece 1 comprising two component panel sections 2 and 3 joined to each other along two weldments 4 and 5 formed between the confronting lower and upper face sheets, respectively, may be seen from FIGURE 1. Workpiece component 2 comprises upper and lower face sheets 10 and 14, respectively, joined to a lightweight core section 18 such as honeycomb material, while workpiece component 3 is of identical construction having face sheets 12 and 16 with core material 20 therebetween.

Referring to FIGURE 2 it may be seen that the novel method of forming workpiece 1 of FIGURE 1 involves initial preparation of the confronting panel edges to be joined by appropriate cutting to remove a portion of core elements 18 and 20 so that flange-like structure formed by upper and lower face sheets 10–16 results. Lower face sheets 14 and 16 on panel components 2 and 3, respectively, are accurately cut to form abutting edges which may contact each other continuously throughout their entire length while upper skin surfaces 10 and 12, respectively, are accurately cut to form confronting edges which are separated by a gap 22 of substantially constant width throughout its length. Lower face sheets 14 and 16 while arranged in abutting contact as shown by FIGURE 2 are welded to produce a seam or joint 4. Weldment 4 is preferably accomplished by means of an electrode 24 through gap 22 in the manner shown by FIGURE 2, although gas welding means may be used if access of such means through gap 22 is permitted by the form of gas torch used. Electrode 24 may comprise a standard tungsten electrode of conventional type, to which welding power may be supplied from a suitable source (not shown) with the welded workpiece in circuit therewith. Appropriate insulating means such as sleeve 26 of dielectric insulating material may be installed on electrode 24 to prevent arcing between the electrode and the confronting metallic edges on either side of gap 22 as shown in FIGURE 2. Alternatively, a bare electrode may be used in conjunction with suitable insulating material applied to the confronting edges of gap 22. Thus, the welding of seam 4 is accomplished by shielded electrode 24 insulated along a portion of its length to prevent electrical contact between the electrode and the surrounding structure, and positioned in welding relationship with respect to workpieces 2 and 3 by extending the electrode through gap 22. It is of particular significance in the concept disclosed herein that gap 22 is of relatively narrow width, and need be sufficient only to accommodate electrode 24 together with the insulating layer thereon, and to provide sufficient clearance for movement of the electrode along the welding path. Thus, welding of structure such as shown in FIGURES 1–3 has been successfully accomplished using an electrode of 1/8 inch diameter and a gap 22 of 5/32 inch width.

Upon completion of the joinder of lower face sheets 14 and 16 along weldment 4 as described above, welding in the final stage of assembly such as required to form the novel connection between panel workpiece components 2 and 3 shown in FIGURE 1, for example, is necessary. Referring to FIGURE 3, it may be seen that gap 22 between upper face sheets 10 and 12 may be closed by means of a member 28 comprising a closure strip joined at either side thereof in abutting relationship with face sheets 10 and 12. Several different kinds of conventional welding apparatus known to the prior art are adapted to perform welding between closure strip 28 and face sheets 10 and 12 on either side thereof. As in the case of seam 4 discussed above, the inventive method for accomplishing welding along seam 5 is not limited to the use of any particular welder in connection with welding of closure strip 28. However, due to the thinness of the sheet materials from which workpiece components 2 and 3 are fabricated, uncontrollable and uneven distortion of workpiece components is frequently encountered in the use of conventional apparatus which applies welding heat at a non-uniform rate or in excessive amounts, especially where seams 4 and 5 are welded separately at different times. Much of the difficulty in welding thin-walled workpiece components such as described herein may be avoided by use of the novel welding apparatus shown in FIGURES 4 and 5.

Considering FIGURE 4, it may be seen that the novel welding apparatus disclosed herein includes mounting means in the form of carriage 30 which is supported by structure (not shown) in a manner permitting relative movement between carriage 30 and the workpiece to be welded. A plurality of separate welding means is provided in the form of electrodes 24 and 32 which are mounted on carriage 30 as shown in FIGURE 4, whereby welding along seams 4 and 5 may be simultaneously accomplished at different locations on workpiece 1. Thus electrode 24 moves along a welding path coinciding with the abutting edges of the lower face sheets 14 and 16 as permitted by penetration of the electrode through gap 22 between the confronting edges of upper face sheets 10 and 12. Simultaneously with the stated movement of electrode 24, electrode 32 accomplishes welding as required to join closure strip 28 to each of the upper face sheets 10 and 12. Suitable means for supplying closure strip 28 continuously to the area of weld seam 5 in predetermined relationship with face sheets 10 and 12 may be provided in the form of roller 34 supported by bracket 36 on carriage 30. The stated means for supplying closure strip 28 may further include tunnel means 38 in carriage 30 if necessary. It will be understood by those skilled in the art that various well known welding devices may be adapted for use in connection with welding closure strip 28 in the stated relationship. Thus, for example, oscillating means for causing lateral movement of electrode 32 in a direction generally transverse to the movement of carriage 30 may be employed to widen the fusion zone so as to include both of the confronting edges of upper face sheet 10 and 12 on either side of gap 22. The inventive concept disclosed herein is not limited to any precise choice of welding apparatus to accomplish welding along seam 5, but it is sufficient if the precise device for welding seam 5 is mounted in a manner permitting simultaneous welding of seams 4 and 5 at separate but relatively proximate locations on common workpiece 1. Moreover, in the event that the power requirements for weld seam 4 and other consideration depending on the workpiece size and arrangement requires a relatively large size for electrode 24 with commensurate increase in the width of gap 22, electrode 32 may be replaced by a pair of electrodes positioned for welding along parallel seams on either side of closure strip 28 instead of a single oscillating electrode as mentioned above.

Figure 5:
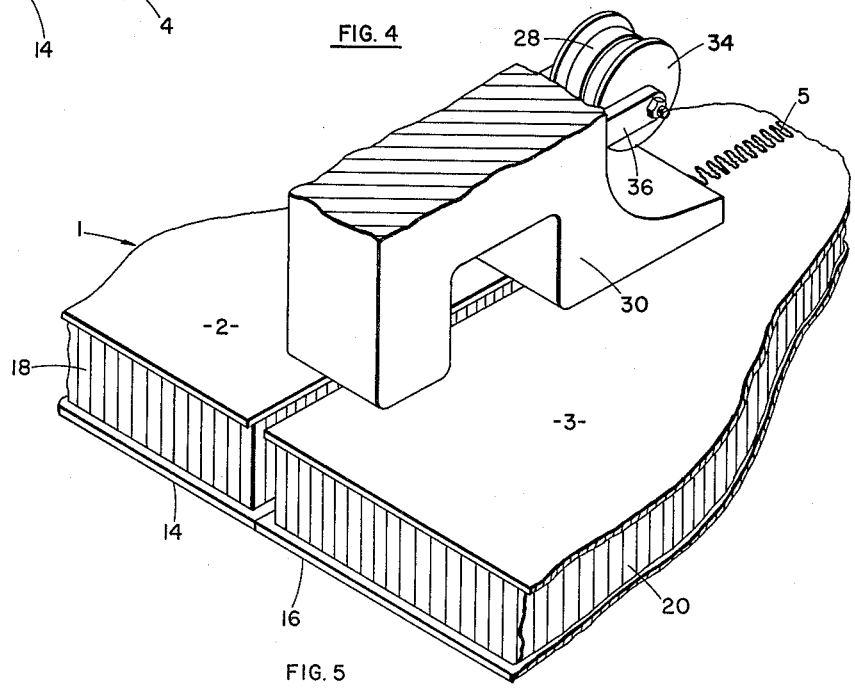

From the description set forth above, it may be seen that the invention disclosed herein provides a novel welding method by means of which extremely narrow apertures or gaps such as gap 22 in a structural member may be used to permit welding at locations which would otherwise be inaccessible and in situations where welding would be impossible by conventional methods and apparatus. Moreover, application of the novel method described above in joining lightweight sandwich type panels provides improved structural joints characterized by greater strength and substantially less distortion than was heretofore possible in welding workpieces of thin-walled construction. The teachings set forth herein are particularly applicable to workpiece materials exhibiting a severe sensitivity to residual stresses and shrinkage effects, such as precipitation hardened steels, and could be applied to application of heat for the purpose of stress relieving relatively in accessible areas of a workpiece as well as welding the same. Thus, simultaneous joinder of the upper and lower face sheets on two confronting panel workpieces as described in connection with FIGURE 1, for example, results in relative freedom from distortion due to the concurrence of shrinkage in both upper and lower face sheets at substantially the same moment. The invention further includes novel apparatus for achieving the stated joint as shown in FIGURES 4 and 5 and discussed above.

While the particular details set forth above and in the drawings are fully capable of attaining the objects and providing the advantages herein stated, the structure and method thus disclosed are merely illustrative and could be modified or varied to produce the same results without departing from the scope of the invention concept as defined in the appended claims.

1. A method of applying heat progressively along a desired path at a workpiece location obstructed by a structural surface comprising; providing a relatively small aperture in said surface, extending elongate heating means through said aperture whereby said heating means applies heat to said location when energized, and moving said heating means along said path.

2. The method of claim 1 wherein the area of said aperture is sufficient only to accommodate the cross-sectional area of said elongate heating means and to permit movement thereof only as necessary to apply heat at said location.

3. The method of claim 1 wherein said elongate heating means comprises a bare electrode.

4. A method of welding together two members each having two spaced-apart distal edges whereby a joint is formed between a first confronting pair of said edges to join said two members, said method consisting of; providing a relatively narrow gap between a second confronting pair of said edges on each of said two members, and extending a bare electrode through said gap to weld said first confronting pair of edges together, the width of said gap being substantially identical to the diameter of said electrode.

5. A method of welding together two workpiece components each having a lightweight core of relatively low density material and a face sheet of greater density than said material affixed on either side of said core, said method comprising; preparing a marginal edge on each of said face sheets on each said component whereby said marginal edges extend slightly beyond said core by a predetermined amount, placing said two components adjacent each other with said face sheets of said components in confronting relationship whereby a gap exists between two of said face sheets on one side of said components, and effecting a weld joint between two of said face sheets on the other side of said components by extending elongate welding means through said gap.

6. Welding apparatus for simultaneously forming a plurality of weldments on a workpiece, comprising; carriage means supported on one side of said workpiece and adapted for movement with respect to an external surface of said workpiece, relatively slender elongate welding means mounted on said carriage means for forming a first weldment within said workpiece by extending through an aperture in said surface whereby said elongate welding means extends into the interior of said workpiece beyond said surface, separate welding means mounted on said carriage means for forming a second weldment in the location of said aperture and joining the edges thereof to close the same.

7. The structure set forth in claim 6 above wherein said workpiece comprises two panels each having a lightweight core of relatively low density material and a face sheet of greater density than said material affixed on either side of said core, said panel being joined together by said first and second weldment, said apparatus being adapted to form said first weldment between the face sheets on one side of said two panels by extending said elongate welding means through said aperture formed by the confronting edges of the face sheets on the other side of said two panels.

8. The apparatus set forth in claim 6 above wherein said elongate welding means comprises a bare electrode.

9. The structure set forth in claim 8 above including in addition thereto, means for supplying a filler strip continuously to the area of said second weldment during welding by said additional welding means whereby said filler strip fills said aperture and is welded therein.

10. The method set forth in claim 4 above, further including the steps of providing filler material sized to substantially fill said gap and substantially aligned between said second confronting pair of said edges and welding said filler material in said position of alignment to close said gap.

11. The method set forth in claim 10 above wherein said welding by said bare electrode is accomplished in one continuous welding pass during simultaneous welding of said filler material to close said gap.

12. The method set forth in claim 5 above further including the steps of providing filler material sized to fit within said gap in substantial alignment between said two faces sheets and securing said filler material to said two face sheets to close said gap after completion of welding by said elongated welding means.

13. The method set forth in claim 5 above further including the steps of providing filler material sized to fit within said gap in substantial alignment between said two face sheets, said filler material being progressively provided in said position of alignment during said welding by said elongate welding means, and simultaneously securing said filler material to said two face sheets to close said gap during said welding by said elongate welding means.

14. The method set forth in claim 1 above including the further steps of providing filler material sized to fill said aperture in said surface and applying heat to said filler material and said surface to join the same after said movement of said heating means.

References Cited in the file of this patent

UNITED STATES PATENTS

| | | |
|---|---|---|
| 405,345 | Coffin | June 18, 1889 |
| 2,007,892 | Farr | July 9, 1935 |
| 3,012,130 | Harrison | Dec. 5, 1961 |